(12) United States Patent
Tao et al.

(10) Patent No.: US 8,315,669 B2
(45) Date of Patent: Nov. 20, 2012

(54) FEMTO CELL BASE STATION AND METHOD

(75) Inventors: Huiyu Tao, Oxford (GB); Hai Zhou, Swindon (GB)

(73) Assignee: Alcatel Lucent, Paris (FR)

( * ) Notice: Subject to any disclaimer, the term of this patent is extended or adjusted under 35 U.S.C. 154(b) by 361 days.

(21) Appl. No.: 12/553,178

(22) Filed: Sep. 3, 2009

(65) Prior Publication Data

US 2010/0062723 A1    Mar. 11, 2010

(30) Foreign Application Priority Data

Sep. 4, 2008    (EP) .................................... 08360027

(51) Int. Cl.
*H04M 1/00*    (2006.01)
(52) U.S. Cl. .................... 455/561; 455/562.1; 342/354; 342/350; 342/360; 342/368; 342/371
(58) Field of Classification Search .................. 455/561, 455/562.1; 342/354, 350, 360, 368, 367, 342/359, 371–375, 380–385
See application file for complete search history.

(56) References Cited

U.S. PATENT DOCUMENTS

| | | | |
|---|---|---|---|
| 2001/0004604 A1 | 6/2001 | Toshimitsu et al. | |
| 2007/0002805 A1* | 1/2007 | Laurila et al. | 370/337 |
| 2008/0026763 A1 | 1/2008 | Van Rensburg et al. | |
| 2010/0041355 A1* | 2/2010 | Laroia et al. | 455/129 |

FOREIGN PATENT DOCUMENTS

| | | |
|---|---|---|
| EP | 1 077 504 A1 | 2/2001 |
| EP | 1 158 824 A2 | 11/2001 |

OTHER PUBLICATIONS

Claussen H et al., "Self-Optimization of Coverage for Femtocell Deployments," Wireless Telecommunications Symposium, 2008, WTS 2008, IEEE, Piscataway, NJ, USA, XP031275017, pp. 278-285, Apr. 24, 2008.
European Search Report.

* cited by examiner

*Primary Examiner* — Fayyaz Alam
(74) *Attorney, Agent, or Firm* — Fay Sharpe LLP

(57) ABSTRACT

A femto cell base station and a method are disclosed. The method comprises the steps of: a) monitoring data transmission antenna weights used during wireless data transmissions over a femto cell data channel between a femto cell base station and user equipment; b) deriving broadcast channel antenna weights from the data transmission antenna weights; and c) forming the femto cell broadcast channel beam using the broadcast channel antenna weights. The femto cell broadcast channel beam is adapted to minimize interference. The femto cell broadcast channel beam may then be formed using those broadcast channel antenna weights in order to direct and restrict the size of the broadcast channel beam and reduce the likely interference caused by the femto cell to other femto cells and to a macro cell.

15 Claims, 7 Drawing Sheets

FEMTO CELL BASE STATION AND METHOD

FIELD OF THE INVENTION

The present invention relates to a femto cell base station and a method.

BACKGROUND OF THE INVENTION

It is known to provide so-called "femto cells" within macro cells of a wireless communications network. Such femto cells are typically provided where the communications coverage provided by the macro cell is poor or where a user wishes to use an alternative communications link provided locally, rather than utilising the communications link provided by the macro cell, to communicate with a core network. Such a situation might arise where, for example, a user has a pre-existing Internet or other communications link at home or in an office and the user wishes to utilise that link in preference to that provided by a macro cell network provider to communicate with the core network.

Accordingly, it is known to provide a femto base station which generates a femto cell in its vicinity, with which user equipment may communicate in preference to communicating with a base station of the macro cell. To enable the user equipment to communicate with the femto base station, omni-directional broadcast channel beams are typically formed and, once communication between user equipment and the femto base station has been established, data channel beams are formed to enable data transmission to occur.

However, whilst the generation of femto cells enables improved communication between user equipment and the core network to occur, the proliferation of femto cells can cause undesirable consequences.

Accordingly, it is desired to provide an improved technique for generating a femto cell.

SUMMARY OF THE INVENTION

According to a first aspect of the present invention there is provided a method of establishing a femto cell broadcast channel beam, the method comprising the steps of: a) monitoring data transmission antenna weights used during wireless data transmissions over a femto cell data channel between a femto cell base station and user equipment; b) deriving broadcast channel antenna weights from the data transmission antenna weights; and c) forming the femto cell broadcast channel beam using the broadcast channel antenna weights.

The first aspect recognises that a problem with femto cells is that they can interfere with each other and with the macro cell. This is because common channels, such as the broadcast channels, are formed into an omnidirectional beam in order that communication with the femto cell base station can be established when within the femto cell. A problem with forming an omnidirectional beam is that most buildings are of irregular shape and so the omnidirectional beam will cover an area much larger than the building and possibly its grounds, which can cause interference with other femto cells and provides for a higher than necessary amount of interference within the macro cell.

Accordingly, the femto cell broadcast channel beam is adapted to minimise such interference. This is achieved by monitoring data transmission antenna weights which are used during data transmissions between the femto cell base station and user equipment. It will be appreciated that the data transmissions may relate to information, voice, signalling or other data. Once a wireless data transmission has been initiated between a femto cell base station and user equipment, antenna weights may be applied to the plurality of antennas utilised by the femto cell base station in order to shape and direct the data channel beam utilised to support the data transmission. The broadcast channel antenna weights may then be derived from the data transmission antenna weights since the data transmission antenna weights provide an indication of the likely location of the user equipment within the femto cell.

The femto cell broadcast channel beam may then be formed using those broadcast channel antenna weights in order to direct and restrict the size of the broadcast channel beam and reduce the likely interference caused by the femto cell to other femto cells and to the macro cell.

In one embodiment, the step b) comprises: deriving the broadcast channel antenna weights by averaging the data transmission antenna weights. By averaging the data transmission antenna weights, a suitable broadcast channel beam may be formed which takes account of the likely locations of the user equipment.

In one embodiment, the step b) comprises: deriving the broadcast channel antenna weights from most recent of the data transmission antenna weights. By utilising the most recently used data transmission antenna weights, the broadcast channel beam is adapted to cover the most recent user equipment locations.

In one embodiment, the step b) comprises: deriving the broadcast channel antenna weights by weighting most recent of the data transmission antenna weights in favour of less recent of the data transmission antenna weights. By favouring the most recent antenna weights over the previous data transmission antenna weights, the broadcast channel beam may be generated to cover those most recent user equipment locations rather than previous user equipment locations which may no longer routinely be in use. For example, the location of a user's office may change to another part of the building and the broadcast channel beam may be adapted to now cover that part of a building that may not have previously been covered. The now unused part of the building may then cease to be covered. Likewise, during periods of good weather, a user may communicate from his garden, which may not have previously been covered by the broadcast channel beam and the beam may be adapted to provide coverage.

In one embodiment, the method comprises the step of: setting the broadcast channel antenna weights to an initial predetermined value. Accordingly, the broadcast channel antenna weight may be preset in order to provide a predetermined shape broadcast channel beam. This predetermined beam pattern may be utilised on first initiation of the fern to base station or in response to a user requested reset.

In one embodiment, the step a) comprises: monitoring data transmission antenna weights used during wireless data transmissions over a femto cell data channel between a femto cell base station and user equipment every predetermined period. The data transmission antenna weights may be monitored periodically. The extent of such monitoring will typically depend on the resources available to the femto base station and the degree of responsiveness required from the femto base station to changes in location of the user equipment.

In one embodiment, the step a) comprises: monitoring data transmission antenna weights averaged over each completed wireless data transmission. Accordingly, an average of the antenna weights applied during every data transmission may be monitored in order to provide an indication of the average location of the user equipment and reduce the resources required to be provided by the femto base station.

According to a second aspect of the present invention there is provided a femto cell base station, comprising: a plurality of antennas operable to establish wireless communication with user equipment; an antenna weighting matrix operable to apply antenna weightings to the plurality of antennas during the wireless communication; monitoring logic operable to monitor data transmission antenna weights used during wireless data transmissions over a femto cell data channel with the user equipment; derivation logic operable to derive broadcast channel antenna weights from the data transmission antenna weights and to supply the broadcast channel antenna weights to the antenna weighting matrix to enable a femto cell broadcast channel beam to be formed using the broadcast channel antenna weights.

In one embodiment, the derivation logic is operable to derive the broadcast channel antenna weights by averaging the data transmission antenna weights.

In one embodiment, the derivation logic is operable to derive the broadcast channel antenna weights from most recent of the data transmission antenna weights.

In one embodiment, the derivation logic is operable to derive the broadcast channel antenna weights by weighting most recent of the data transmission antenna weights in favour of less recent of the data transmission antenna weights.

In one embodiment, the derivation logic is operable to set the broadcast channel antenna weights to an initial predetermined value.

In one embodiment, the monitoring logic is operable to monitor data transmission antenna weights used during wireless data transmissions over a femto cell data channel between a femto cell base station and user equipment every predetermined period.

In one embodiment, the monitoring logic is operable to monitor data transmission antenna weights averaged over each completed wireless data.

According to a third aspect of the present invention there is provided a computer program product operable, when executed on a computer, to perform the method steps of the first aspect.

Further particular and preferred aspects of the present invention are set out in the accompanying independent and dependent claims. Features of the dependent claims may be combined with features of the independent claims as appropriate, and in combinations other than those explicitly set out in the claims.

BRIEF DESCRIPTION OF THE DRAWINGS

Embodiments of the present invention will now be described further, with reference to the accompanying drawings, in which.

DESCRIPTION OF THE EMBODIMENTS

Figure 1:
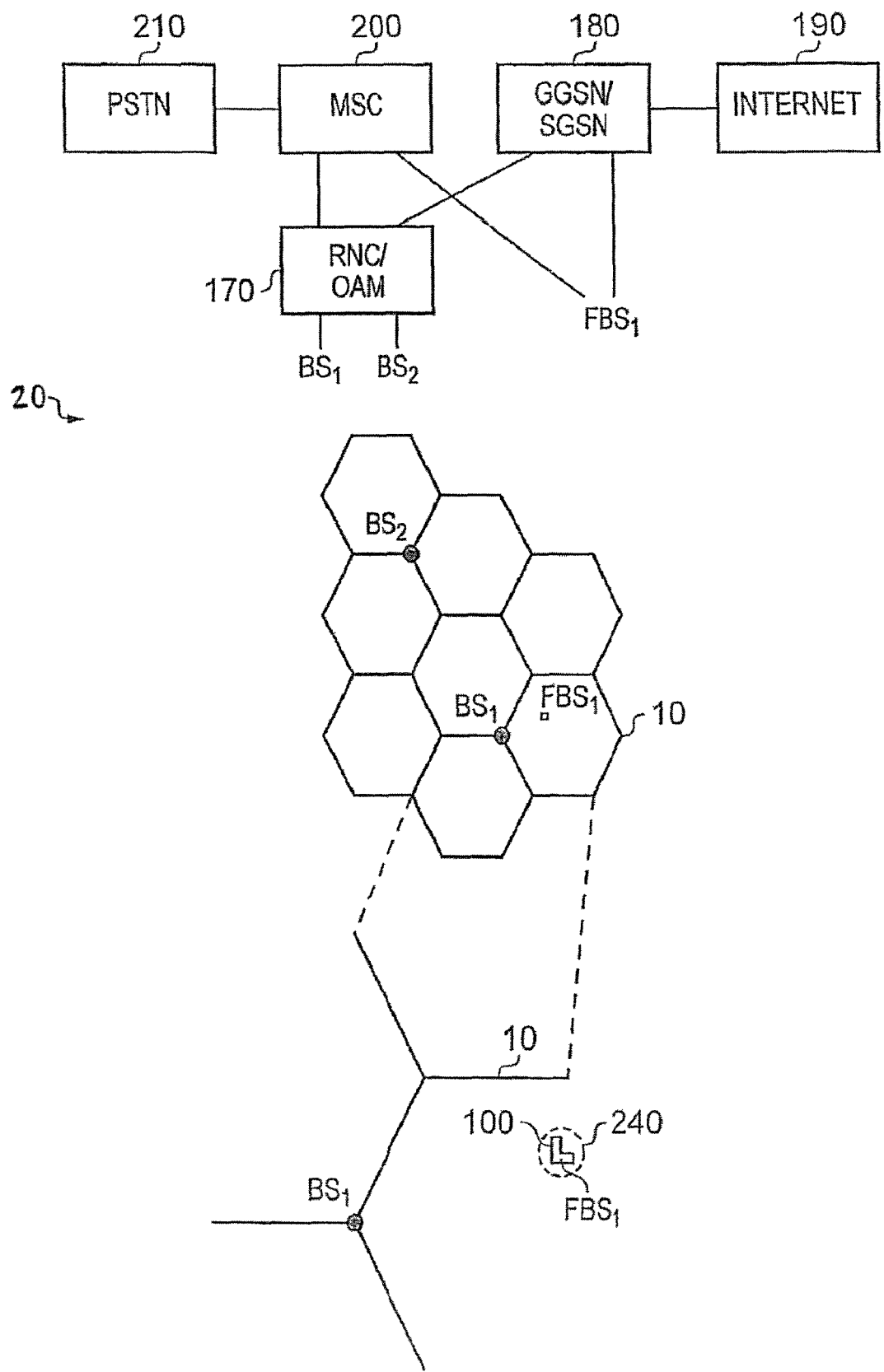
FIG. 1 is a schematic diagram illustrating a wireless communication system incorporating a femto cell.

FIG. 1 illustrates a wireless communication system, generally 20, according to one embodiment. User equipment (not shown) roam through the wireless communications system 20. A number of base stations $BS_1$, $BS_2$ are provided which are distributed geographically in order to provide a wide area of coverage to user equipment. Each base station $BS_1$, $BS_2$ may support one or more macro cells 10. When user equipment is within a sector supported by one of the base stations $BS_1$, $BS_2$ then communications may be established between the user equipment and the associated base station over an associated radio link. Of course, it will be appreciated that FIG. 1 illustrates a small subset of the total number of user equipment and base stations that may be present in a typical telecommunications network.

The wireless communications system 20 is managed by a network controller 170 which includes a radio network controller (RNC) and an operations administration manager (OAM). The network controller 170 controls the operation of the wireless communications system 20 by communicating with the base stations $BS_1$, $BS_2$ over a communications link. The network controller 170 also communicates with the user equipment via their respective radio links in order to efficiently manage the wireless communications system 20.

The network controller 170 maintains a neighbour list which includes information about the geographical relationship between macro cells supported by base stations as well as details of femto cells 240 within macro cells. In addition, the network controller 170 maintains historic location information which provides information on the previous locations of the user equipment within the wireless communications system 20 to enable future predictions on user equipment location to be made. The network controller 170 is operable to route traffic via circuit switched and packet switched networks. Hence, a mobile switching centre 200 is provided with which the network controller 170 may communicate. The mobile switching centre 200 then communicates with a circuit switched network such as a public switched telephone network (PSTN) 210. Likewise, the network controller 170 communicates with Serving General Packet Radio Service Support Nodes (SGSNs) and a Gateway General Packet Radio Support Node (GGSN) 180. The GGSN then communicates with a packet switched core 190 such as, for example, the Internet.

Within a macro cell 10 associated with base station $BS_1$ there is provided a femto cell base station $FBS_1$ which provides a femto cell 240 in the vicinity of the building 100. The femto cell 240 provides local communications coverage for a user in the vicinity of the building 100. The femto cell base station $FBS_1$ communicates with the MSC 200 and the SGSN 180. A handover occurs between the base station $BS_1$ and the femto cell base station $FBS_1$ when the femto base station $FBS_1$ detects that user equipment comes within range.

Figure 2:
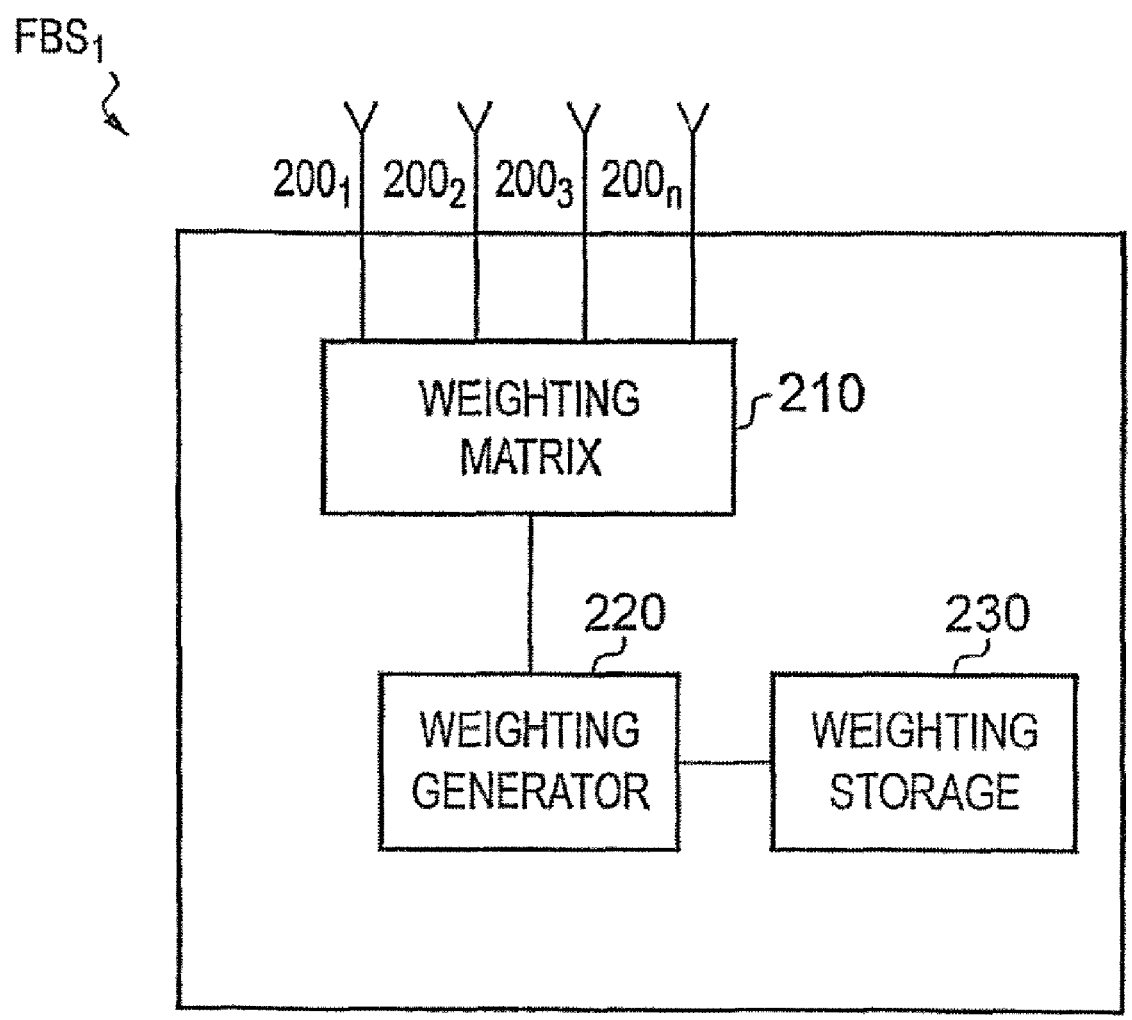
FIG. 2 illustrates components of a femto cell base station according to one embodiment.

FIG. 2 illustrates the femto base station $FBS_1$ in more detail. The femto base station $FBS_1$ comprises a plurality of antennas $200_1$ to $200_n$. The plurality of antennas $200_1$ to $200_n$ are coupled with a weighting matrix 210. The weighting matrix 210 applies antenna weightings to each of the antennas $200_1$ to $200_n$ in order to form a beam into a desired size and shape. It will be appreciated that the resolution to which the beam may be formed will be dependant upon the number and configuration of the antennas $200_1$ to $200_n$. Each antenna weighting is a complex number, based on the received signal strength and phase at each of the antennas $200_1$ to $200_n$ of a signal from user equipment.

A weighting generator 220 generates the antenna weightings based on the received signals in order to form a beam covering location of the user equipment determined from the signal strength and phase information at each antenna $200_1$ to $200_n$. The antenna weightings generated for use by the broadcast channels and the antenna weightings generated for use during data transmission will generally differ. The antenna weightings generated by the weighting generator 220 during data transmission are in response to the received signal strength and phase at each of the antennas $200_1$ to $200_n$ and will seek to form the data transmission beam as closely as possible around the user equipment. However, the antenna weightings generated by the weighting generator 220 for the broadcast channel beam form a beam over an area where it is anticipated that the user equipment is likely to be, based on historic data transmissions. Accordingly, weighting storage 230 is provided into which antenna weightings utilised when forming data transmission beams may be stored so that these historic weightings may be used when determining the weightings to be utilised to form the broadcast channel beams.

Figure 3:
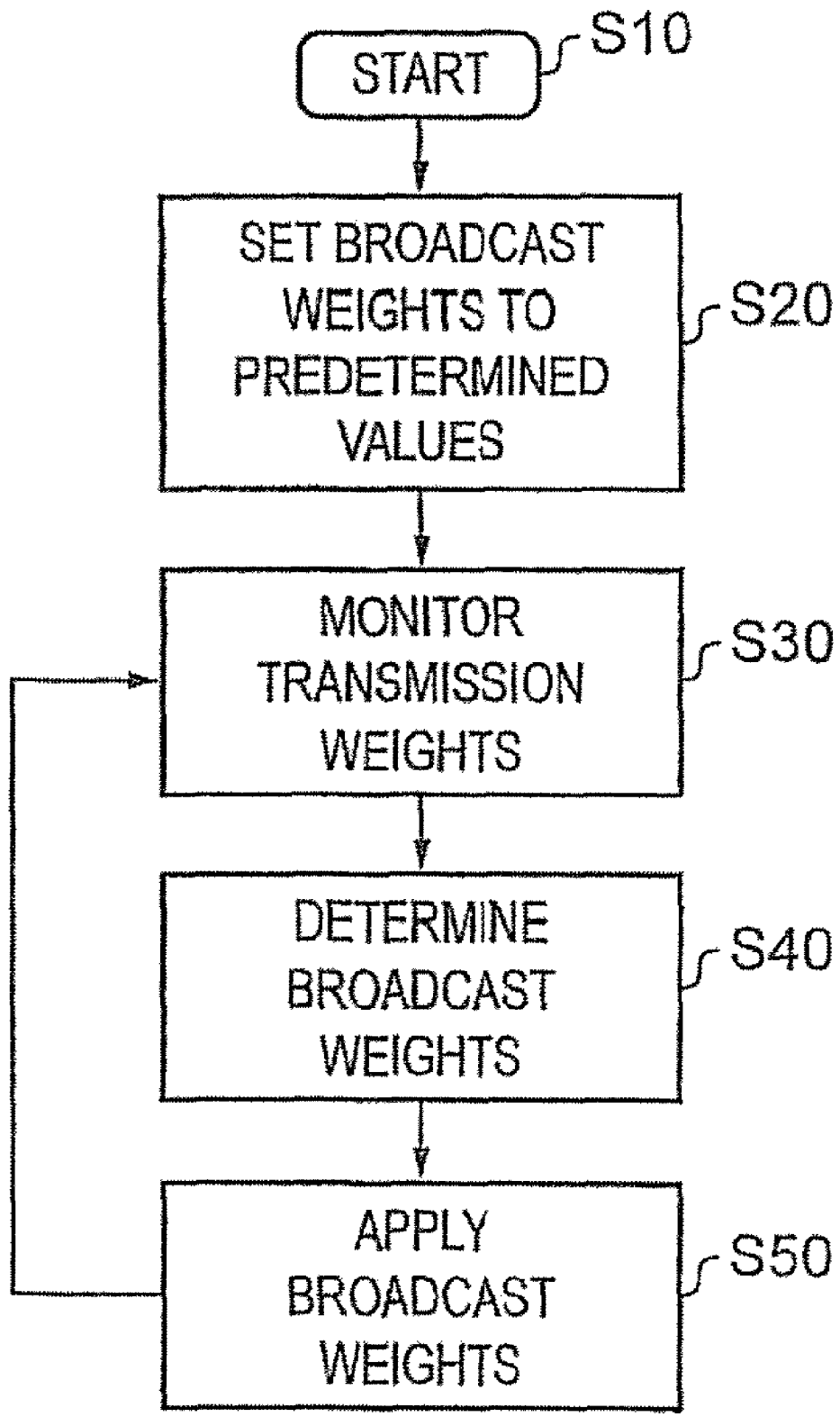
FIG. 3 is a flow chart detailing the main operating steps of the femto cell base station shown in FIG. 2.

FIG. 3 is a flowchart illustrating the main processing steps of the femto base station $FBS_1$.

At step S10, processing begins and proceeds to step S20.

At step S20, following a first initialisation of the femto base station $FBS_1$ or following a reset request by a user, the weighting storage 230 is cleared and the weighting generator 220 provides predetermined antenna weightings for the broadcast channels. These predetermined weightings then form a beam having a predetermined initial shape and size as an initial setting. For example, the predetermined weightings may initially set up omnidirectional broadcast channel beams to provide initial coverage until information on user behaviour can be gathered. Processing then proceeds to step S30.

At step S30, antenna weightings generated by the weighting generator 220 in response to active user equipment performing a data transmissions with the femto base station $FSB_1$ will be monitored. In this arrangement, the antenna weightings for such data transmission are stored in the weighting storage 230 for subsequent use. The exact nature of the antenna weightings stored will vary from implementation to implementation, dependant on the sensitivity and responsiveness required of the femto base station $FBS_1$, and the resources available. For example, antenna weightings generated by the weighting generator 220 may be periodically stored in the weighting storage 230. This periodic storing may occur every few milliseconds, through to every few days, depending on the amount of storage available within the femto base station $FBS_1$. Likewise, the weighting generator 220 may determine an average antenna weighting for each completed data transmission (for example a call) which occurs and provide that average to be stored in the weighting storage 230. Whichever particular implementation is used, the weighting storage 230 will begin to build up a number of antenna weightings associated with historic data transmissions between active user equipment and the femto base station FBS. It will be appreciated that in time the weighting storage 230 may eventually become full and a "first-in first-out" FIFO arrangement may be utilised whereby the oldest antenna weightings are discarded from the weighting storage 230 in order to store the most recent antenna weightings and therefore information relating to the most recent locations of the user equipment are stored. Any derived broadcast channel antenna weightings will then be based on that most recent information. Once transmission channel antenna weightings have been stored in the weighting storage 230, that information may then be used to determine antenna weightings for the broadcast channels and therefore be utilised to change the shape or size of the broadcast channel beams. Again, how the transmission channel antenna weightings stored by the weightings storage 230 are utilised to determine the broadcast channel antenna weightings will vary from implementation to implementation, dependant on the characteristics required of the femto base station $FBS_1$. Processing then proceeds to step S40.

At step S40, the weighting generator 200 refers to the antenna weightings stored in the weightings storage 230 to determine the antenna weightings to be utilised for the broadcast channels. In a simplistic implementation, the weighting generator 220 averages the antenna weightings stored in the weighting storage 230 to generate the antenna weightings for the broadcast channels. In other implementations, the weighting generator 220 only utilises a predetermined number of the most recent antenna weightings or only utilises those antenna weighting stored within a predetermined period of time. This helps to ensure that the broadcast channel beam is formed around the area which most recently was utilised by the user equipment. Likewise, a weighting scheme may be applied to the store antenna weightings in order to increase the influence of the most recent antenna weightings and reduce the influence of the oldest antenna weightings. Processing then proceeds to step S50.

At step S50, the weighting generator 220 applies the derived broadcast channel antenna weightings to the weighting matrix S10 in order to shape the broadcast channel beams. It can be seen that as the pattern of active usage changes, the shape of the broadcast channel beams will also change in response.

Figure 4:
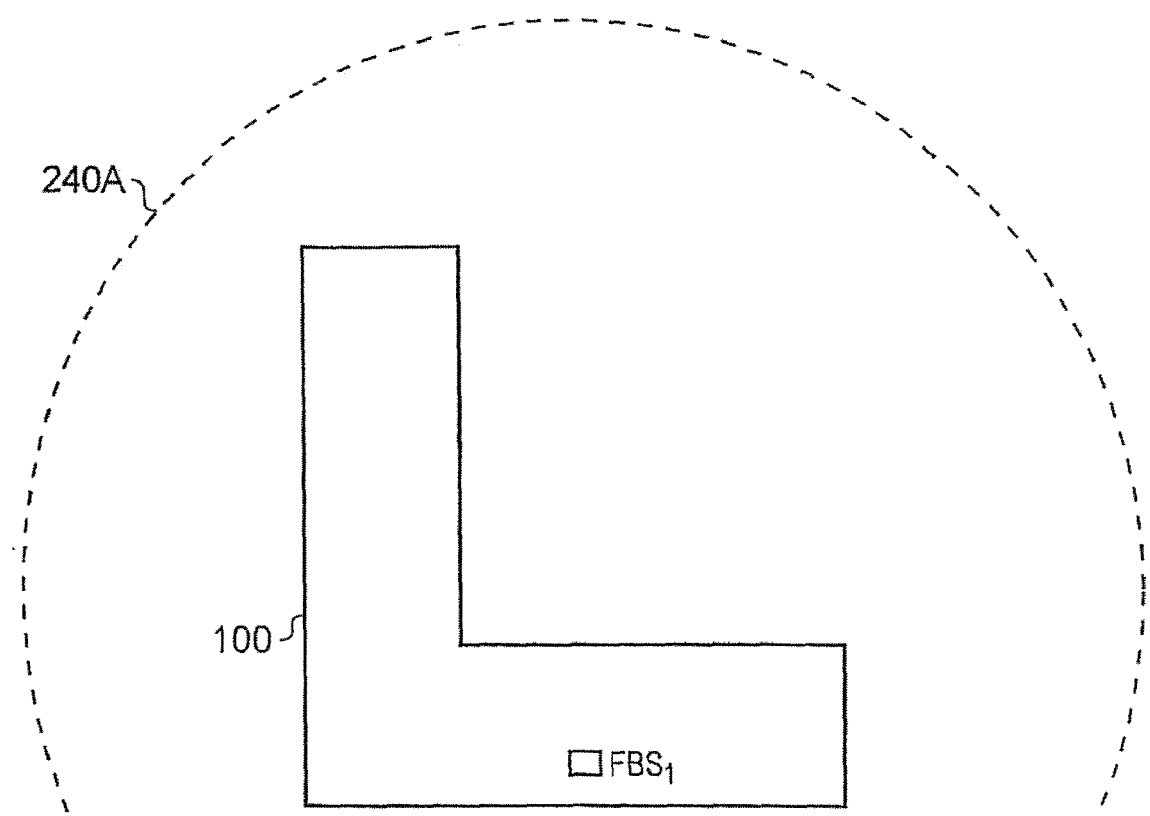
FIG. 4 shows an example initial femto cell broadcast channel beam formed by the femto cell base station of FIG. 2.

FIG. 4 illustrates the operation of the femto base station $FBS_1$ in more detail. On first initialisation of the femto base station $FBS_1$ the weighting storage 230 is cleared and the weighting generator 200 applies a predetermined weighting (in this case a value of 1) to the weighting matrix 210, which causes an omnidirectional broadcast channel beam 240A to be formed. As can be seen, the broadcast channel beam 240A fully encompasses the building 100, but also extends beyond its boundary by a significant amount. Accordingly, it can be seen that in particularly densely populated areas, the broadcast channel beam 240A may extend into other buildings, possibly causing interference with adjacent femto cells and increasing interference within the macro cell 10.

Figure 5:
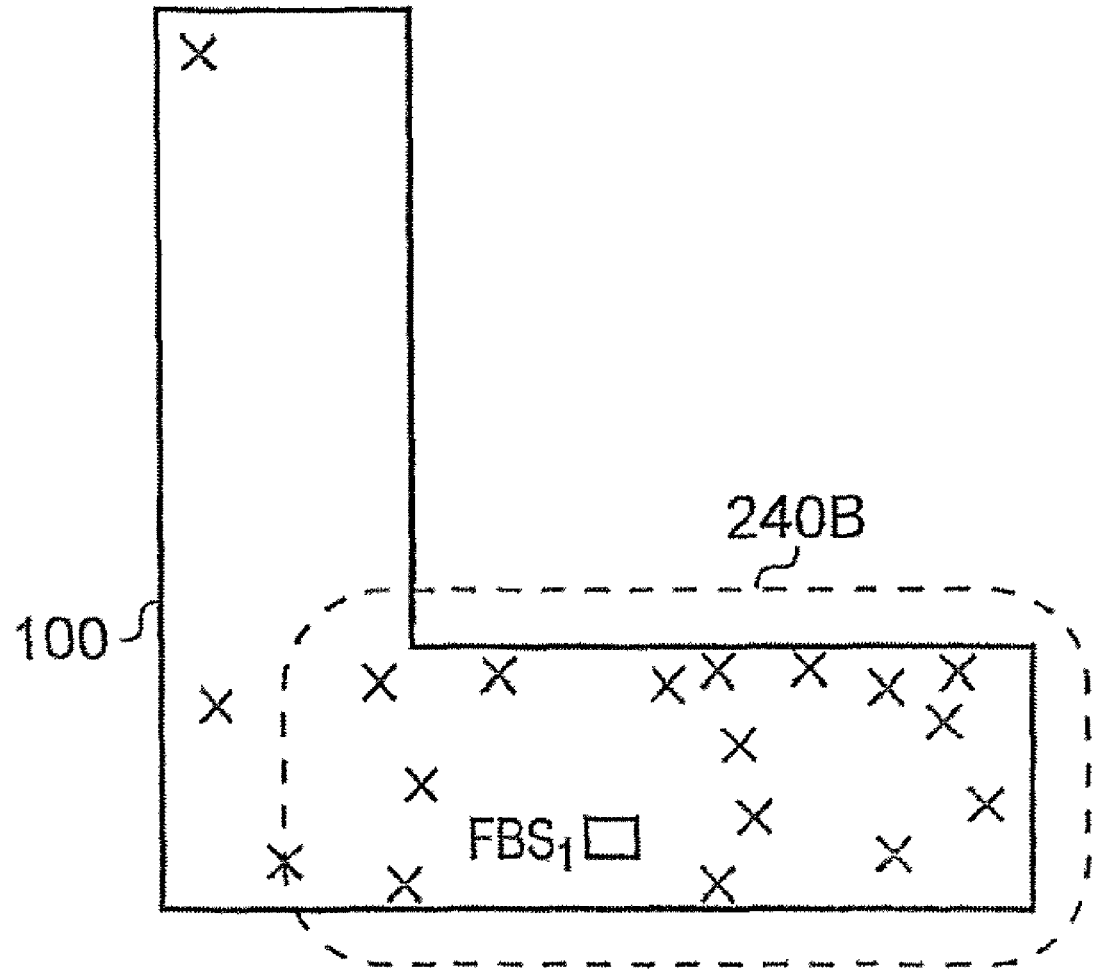
FIG. 5 illustrates an example adapted femto cell broadcast channel beam formed by the femto cell base station of FIG. 2 after a period of time.

FIG. 5 illustrates a modified or adapted broadcast channel beam 240B, generated by the femto base station $FBS_1$ after a predetermined period of time. As can be seen, the broadcast channel beam 240B has a much reduced footprint compared to that of the broadcast channel beam 240A. Each cross shown in the vicinity of the building 100 illustrates an active data transmission that has occurred between user equipment and the femto base station $FBS_1$. Each of those active data transmissions resulted in antenna weightings being stored by the weighting storage 230. The weighting storage 220 utilises those antenna weightings stored within the weighting storage 230 to generate a broadcast channel beam formed more closely around the location of the majority of the active data transmissions. As can be seen, this limits the footprint of the broadcast channel beam 240B, thereby reducing interference with any adjacent femto cells and reducing overall interference within the macro cell 10. Although the footprint of the broadcast channel beam 240B is significantly reduced, user equipment may still establish communication with the femto base station $FBS_1$ outside this broadcast channel beam 240B by iteratively increasing its polling signal until a response is received from the femto base station $FBS_1$. Also, the signal margin and sensitivity of the user equipment will be such that the broadcast channel 240B may still be detected by the user equipment when located in the vicinity of the femto base station $FBS_1$, but outside the footprint of the broadcast channel beam 240B.

Figure 6:
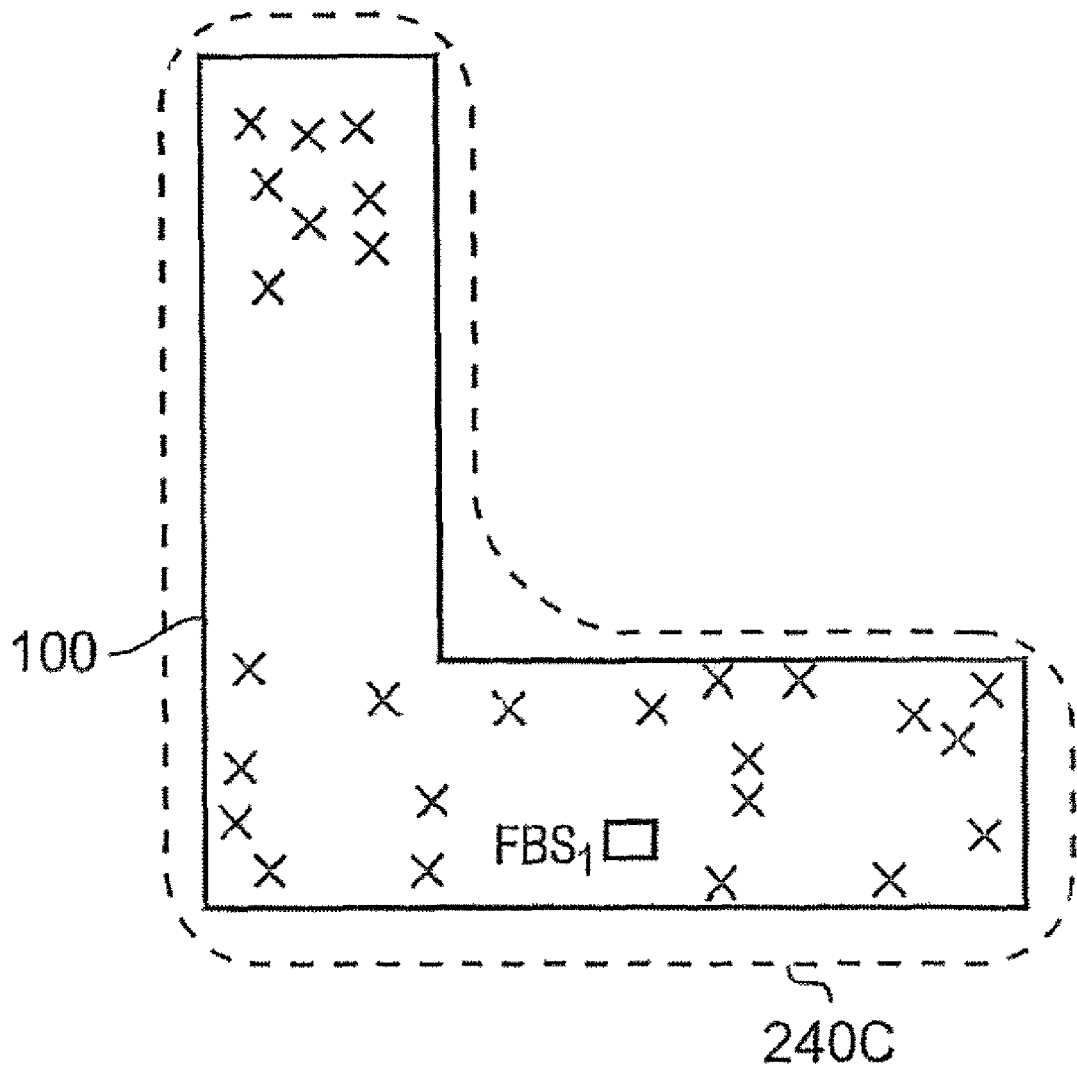
FIG. 6 illustrates an example adapted femto cell broadcast channel beam formed by the femto cell base station of FIG. 2 after a further period of time.

FIG. 6 illustrates a further modified broadcast channel beam 240C after a further period of time. As can be seen, additional active data communication has occurred within another part of the building and the transmission channel antenna weightings for those communications have been stored in the weighting storage 230. Accordingly, the weighting generator 220 generates a broadcast channel beam 240C based on these additional antenna weightings. As can be seen, the broadcast channel beam 240C now more closely aligns with the perimeter of the building 100, thereby providing good coverage within the building 100 whilst minimising any interference with any other femto cells or within the macro cell 10 as a whole.

Figure 7:
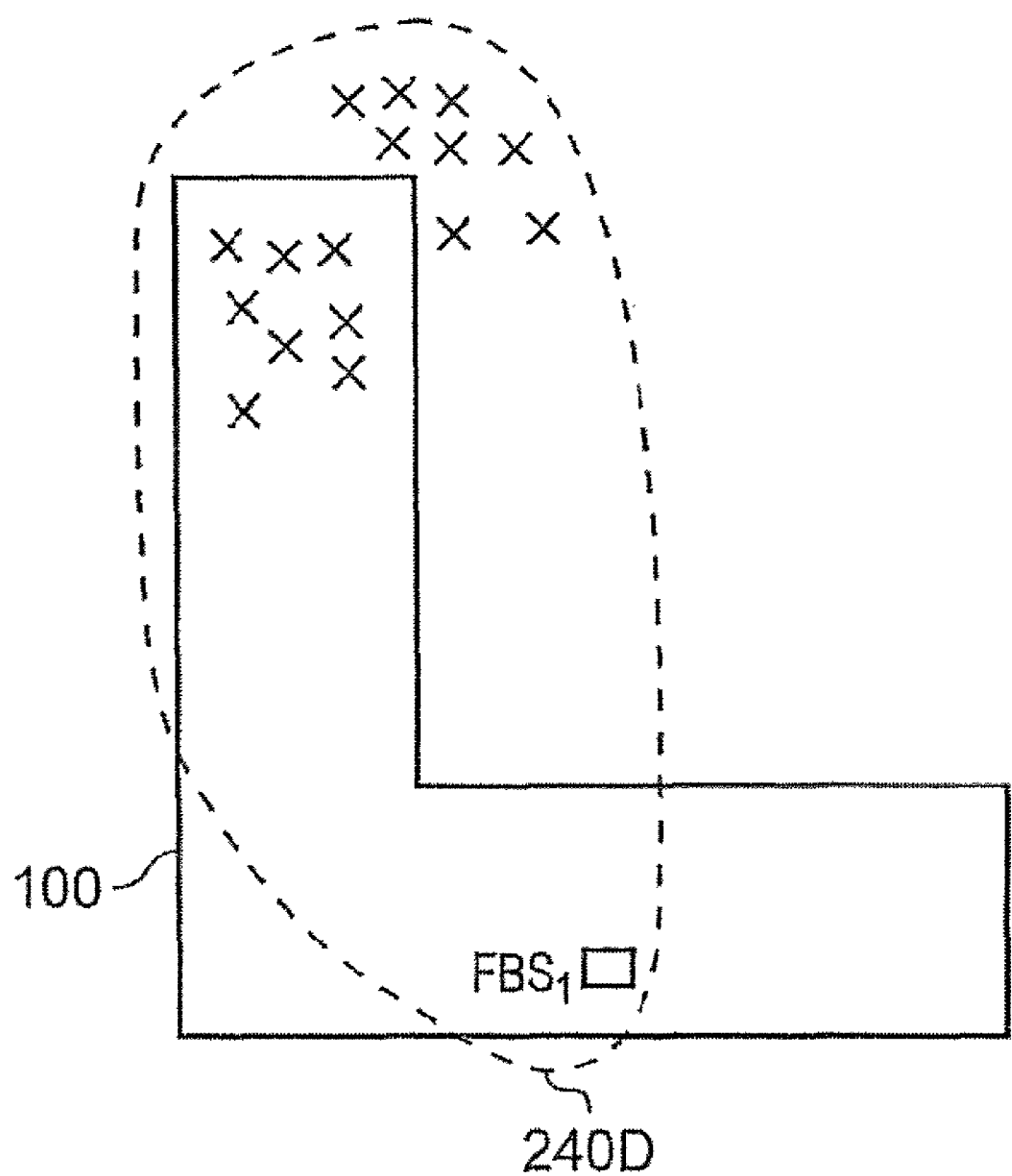
FIG. 7 illustrates an example adapted femto cell broadcast channel beam formed by the femto cell base station of FIG. 2 after a yet further period of time.

FIG. 7 illustrates a broadcast channel beam 240D formed by the femto base station $FBS_1$ after a further predetermined period of time. As can be seen, no recent data transmissions have occurred in a portion of the building 100 previously utilised. Instead, the recent data transmissions have occurred in another portion of the building 100 and in a region outside the building 100. Accordingly, the average of the most recent transmission antenna weightings stored by the weighting storage 230 results in a broadcast channel antenna weighting which forms a beam covering that other portion of the building 100.

Hence, it can be seen that femto cells utilising femto base stations $FBS_1$ with multiple antennas $200_1$ to $200_n$ can form a beam to active user equipment in order to minimise interference to a macro cell network. Common broadcast channels, such as a common pilot channel (CPICH) which does not have any feedback from user equipment and therefore normally would not have sufficient information to form a directed beam, can utilise an algorithm to form a beam over the intended coverage area by using information derived from other data transmissions. Hence, rather than always using an omnidirectional beam which causes interference outside the intended coverage area, a shaped beam for common channels are formed. The coverage for the common channels is shaped iteratively. Initially, an omnidirectional beam is used. As users make calls or connect to the femto base station $FBS_1$, the antenna coefficients (denoted by $S_i$, a complex vector, whose dimension is equal to the number of femto base station antennas) used to form a beam (based on the received signal strength and phase at each femto antenna) to an active user at a location are stored. As more calls or connections are made from various locations within the intended coverage area, the common channel antenna coefficients for forming a beam for an intended coverage area can be derived as an average of the antenna coefficients. Accordingly, a shaped beam for common control channels is formed to conform to the intended coverage area of a building due to the fact that the antenna weights for common channel beams are derived from active usage. This approach minimises interference to the macro network and to other femto cells.

Although illustrative embodiments of the invention have been disclosed in detail herein, with reference to the accompanying drawings, it is understood that the invention is not limited to the precise embodiments shown and that various changes and modifications can be effected therein by one skilled in the art without departing from the scope of the invention as defined by the appended claims and their equivalents.

The invention claimed is:

1. A method of establishing a femto cell broadcast channel beam, said method comprising the steps of: a) monitoring data transmission antenna weights used during wireless data transmissions over a femto cell data channel between a femto cell base station and user equipment; b) deriving broadcast channel antenna weights from said data transmission antenna weights; and c) forming said femto cell broadcast channel beam using said broadcast channel antenna weights.

2. The method of claim 1, wherein said step b) comprises: deriving said broadcast channel antenna weights by averaging said data transmission antenna weights.

3. The method of claim 1, wherein said step b) comprises: deriving said broadcast channel antenna weights from most recent of said data transmission antenna weights.

4. The method of claim 1, wherein said step b) comprises: deriving said broadcast channel antenna weights by weighting most recent of said data transmission antenna weights in favour of less recent of said data transmission antenna weights.

5. The method of claim 1, comprising the step of: setting said broadcast channel antenna weights to an initial predetermined value.

6. The method of claim 1, wherein said step a) comprises: monitoring data transmission antenna weights used during wireless data transmissions over a femto cell data channel between a femto cell base station and user equipment every predetermined period.

7. The method of claim 1, wherein said step a) comprises: monitoring data transmission antenna weights averaged over each completed wireless data transmission.

8. A femto cell base station, comprising: a plurality of antennas operable to establish wireless communication with user equipment; an antenna weighting matrix operable to apply antenna weightings to said plurality of antennas during said wireless communication; monitoring logic operable to monitor data transmission antenna weights used during wireless data transmissions over a femto cell data channel with said user equipment; derivation logic operable to derive broadcast channel antenna weights from said data transmission antenna weights and to supply said broadcast channel antenna weights to said antenna weighting matrix to enable a femto cell broadcast channel beam to be formed using said broadcast channel antenna weights.

9. The femto cell base station of claim 8, wherein said derivation logic is operable to derive said broadcast channel antenna weights by averaging said data transmission antenna weights.

10. The femto cell base station of claim 8, wherein said derivation logic is operable to derive said broadcast channel antenna weights from most recent of said data transmission antenna weights.

11. The femto cell base station of claim 8, wherein said derivation logic is operable to derive said broadcast channel antenna weights by weighting most recent of said data transmission antenna weights in favour of less recent of said data transmission antenna weights.

12. The femto cell base station of claim 8, wherein said derivation logic is operable to set said broadcast channel antenna weights to an initial predetermined value.

13. The femto cell base station of claim 8, wherein said monitoring logic is operable to monitor data transmission antenna weights used during wireless data transmissions over a femto cell data channel between a femto cell base station and user equipment every predetermined period.

14. The femto cell base station of claim 8, wherein said monitoring logic is operable to monitor data transmission antenna weights averaged over each completed wireless data transmission.

15. A computer program product operable, when executed on a computer, to perform the method steps of claim 1.

* * * * *